United States Patent
Arnold et al.

(10) Patent No.: US 9,414,210 B2
(45) Date of Patent: *Aug. 9, 2016

(54) SYSTEM AND METHOD FOR INCORPORATING SHORT MESSAGE SERVICE (SMS) AND MULTIMEDIA MESSAGING SERVICE (MMS) CONTACTS INTO AN INSTANT MESSAGING INTERFACE

(71) Applicant: BlackBerry Limited, Waterloo (CA)

(72) Inventors: Scott Arnold, Etobicoke (CA); Leonid Vymenets, North York (CA); Henry Yao-Tsu Chen, Woodinville, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,752

(22) Filed: Mar. 27, 2015

(65) Prior Publication Data

US 2015/0208215 A1 Jul. 23, 2015

Related U.S. Application Data

(63) Continuation of application No. 13/224,898, filed on Sep. 2, 2011, now Pat. No. 9,014,729.

(60) Provisional application No. 61/379,908, filed on Sep. 3, 2010.

(30) Foreign Application Priority Data

Sep. 3, 2010 (CA) .................................. 2714710

(51) Int. Cl.
*H04W 4/00* (2009.01)
*H04W 4/14* (2009.01)
(Continued)

(52) U.S. Cl.
CPC .............. *H04W 4/14* (2013.01); *H04L 51/046* (2013.01); *H04M 1/2745* (2013.01); *H04M 1/72552* (2013.01); *H04M 1/274508* (2013.01)

(58) Field of Classification Search
CPC ....... H04L 51/04; H04L 12/581; H04L 67/24; H04L 12/5815; H04L 65/403; G06Q 10/107; H04M 1/72552; H04M 2203/4536
See application file for complete search history.

(56) References Cited

U.S. PATENT DOCUMENTS 6,959,193 B1 10/2005 Kim
7,587,482 B2 9/2009 Henderson et al.
(Continued)

FOREIGN PATENT DOCUMENTS

| CA | 2605155 A1 | 4/2009 |
| EP | 2136517 A1 | 6/2008 |
| EP | 2224653 A1 | 9/2010 |

OTHER PUBLICATIONS

YouTube screenshot; ZDP—How to add a mobile contact to Windows Live Messenger—YouTube; Accessed Jul. 18, 2011; http://www.youtube.com/watch?v=hGI9gj5fEJw$feature=related. Harris; Free SMS Chat in Pakistan using Windows Live Messenger | Sizzled Core—Android, Internet Media, Gadget . . . ; Nov. 22, 2009; Accessed Jul. 15, 2011; http:l!www.sizzledcore.com/2009!1 | /22/free-sms-chat-in-pakistan-using-windows-live-messenger/.

(Continued)

*Primary Examiner* — Quan M Hua
(74) *Attorney, Agent, or Firm* — Fleit Gibbons Gutman Bongini & Bianco P.L.; Jon Gibbons

(57) ABSTRACT

A system and method are provided wherein SMS-only contacts are integrated into an IM environment. An IM contact list interface distinguishes between SMS and IM chats (and contacts), such that limitations and potential differential costs associated with the respective mediums can be identified. The system is also configured to route SMS messages into the IM contact list interface for later filtering and/or selection by the user. By providing SMS-specific categories with the IM contact list interface SMS integration operations such as routing of SMS messages can be controlled to avoid degrading the user's experience.

15 Claims, 12 Drawing Sheets

(51) Int. Cl.
*H04M 1/725* (2006.01)
*H04M 1/2745* (2006.01)
*H04L 12/58* (2006.01)

(56) References Cited

U.S. PATENT DOCUMENTS

| | | | |
|---|---|---|---|
| 7,729,481 | B2 | 6/2010 | Thompson et al. |
| 7,826,827 | B2 | 11/2010 | Hull et al. |
| 9,014,729 | B2 | 4/2015 | Arnold et al. |
| 2003/0018726 | A1 | 1/2003 | Low et al. |
| 2003/0225847 | A1 | 12/2003 | Heikes et al. |
| 2006/0233373 | A1 | 10/2006 | Kang |
| 2007/0168436 | A1 | 7/2007 | Andam |
| 2007/0280210 | A1 | 12/2007 | Milstein et al. |
| 2008/0055269 | A1* | 3/2008 | Lemay ............... G06F 3/0482 345/173 |
| 2008/0059627 | A1 | 3/2008 | Hamalainen et al. |
| 2008/0148154 | A1 | 6/2008 | Burrell et al. |
| 2008/0168349 | A1 | 7/2008 | Lamiraux et al. |
| 2009/0100378 | A1 | 4/2009 | Klassen et al. |
| 2010/0069095 | A1 | 3/2010 | Yahav et al. |
| 2010/0107088 | A1 | 4/2010 | Hunt et al. |
| 2011/0173553 | A1 | 7/2011 | Karmon et al. |
| 2012/0165049 | A1 | 6/2012 | Arnold et al. |

OTHER PUBLICATIONS

Muller, B.; Text Message a Cell Phone from Windows Live Messenger | Academic Gadfly; Feb. 8, 2009; Accessed Jul. 15, 2011; http://brienmuller.wordpress.com/2009/02/08/textmessage-a-cell-phone-from-windows-live-messenger!.

Windows Live Messenger; Microsoft News Center; Accessed Jul. 15, 2011; http://www.microsoft.com/presspass/newsroom/msn/factsheet/WLMessengerFS.mspx.

Search Report from corresponding PCT Application No. PCT/CA2011/000990 search completed Dec. 19, 2011.

US Office Action dated Feb. 14, 2013, received for U.S. Appl. No. 13/224,898.

US Office Action dated Aug. 5, 2014, received for U.S. Appl. No. 13/224,898.

De Biolley, L.; Search Report from Corresponding European Application No. 11179912.8; Search completed Dec. 3, 2013.

US Office Action dated Apr. 2, 2014, received for U.S. Appl. No. 13/224,898.

US Office Action dated Jul. 25, 2014, received for U.S. Appl. No. 13/224,898.

* cited by examiner

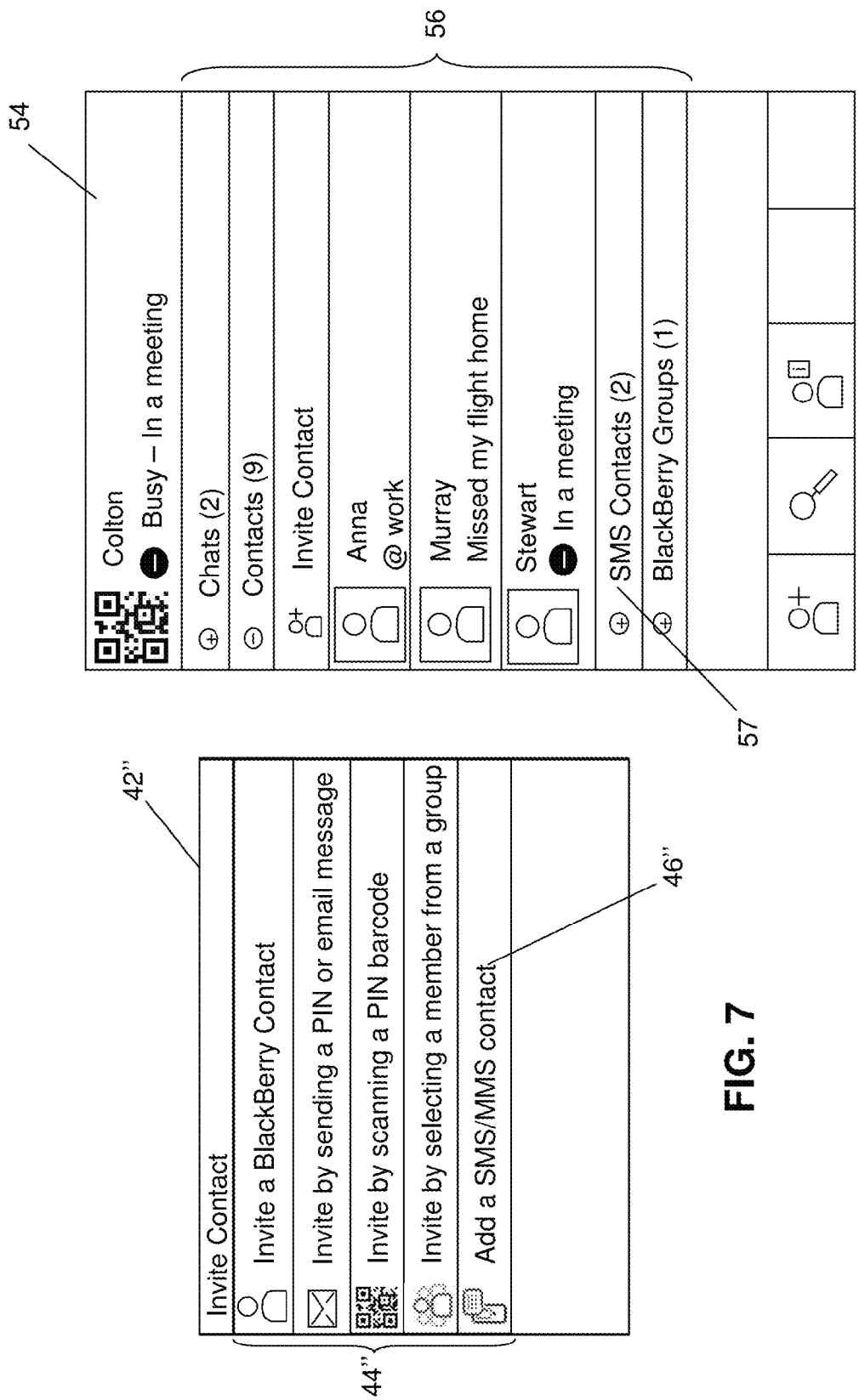

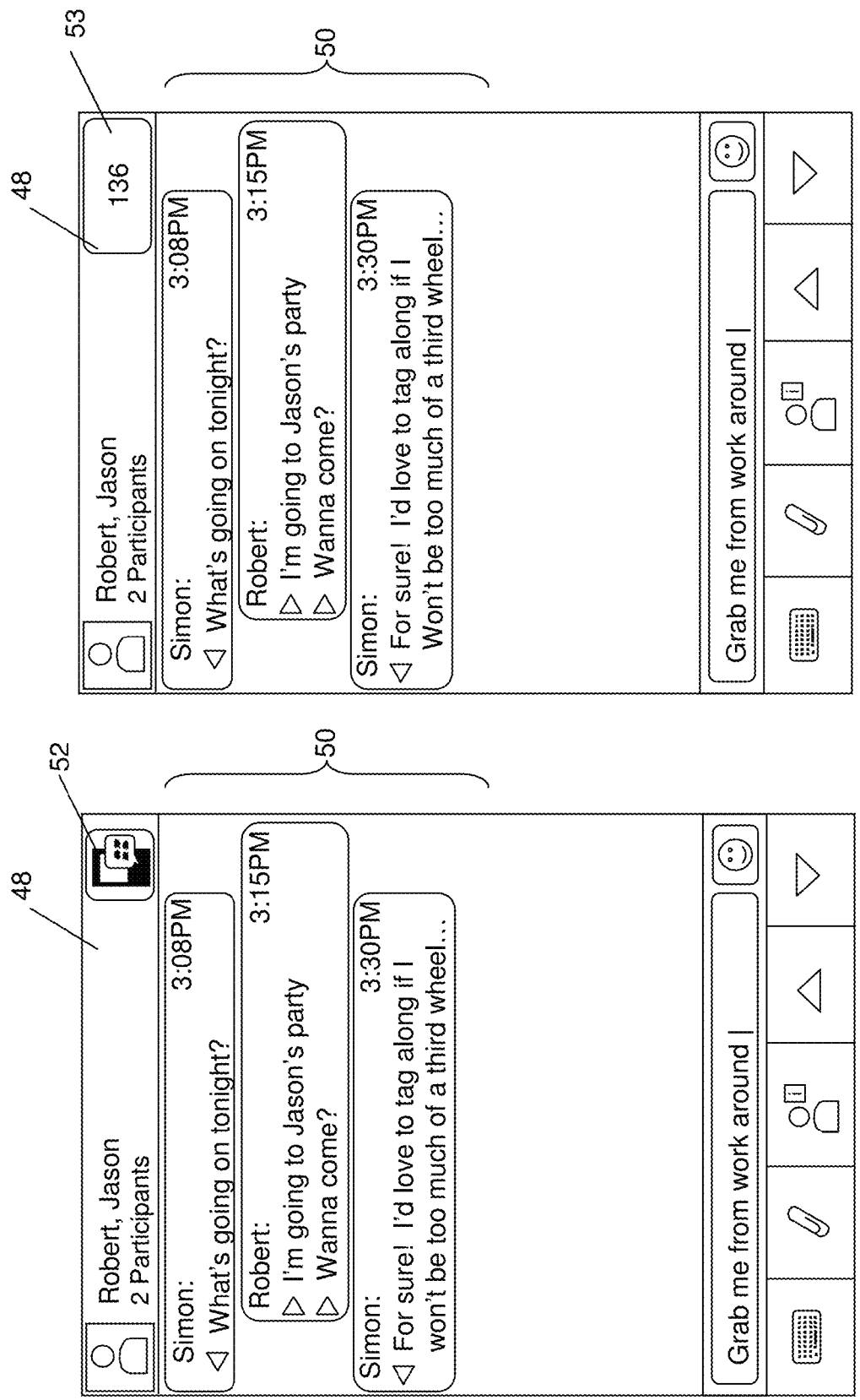

SYSTEM AND METHOD FOR INCORPORATING SHORT MESSAGE SERVICE (SMS) AND MULTIMEDIA MESSAGING SERVICE (MMS) CONTACTS INTO AN INSTANT MESSAGING INTERFACE

This application claims priority from U.S. Provisional Patent Application No. 61/379,908 filed on Sep. 3, 2010, and Canadian Patent Application No. 2,714,710 filed on Sep. 3, 2010, the contents of both applications being incorporated herein by reference.

TECHNICAL FIELD

The following relates to incorporating short message service (SMS) and multimedia messaging service (MMS) contacts into an instant messaging (IM) interface.

BACKGROUND

Mobile communication devices are often used to communicate via several different media. For example, a smart phone or personal digital assistant (PDA) having wireless communication capabilities may be used to participate in cellular telephone conversations, to exchange email, to exchange SMS or multimedia messaging service (MMS) messages, to participate in IM or other conversational type message exchanges, to post or receive social networking updates, etc.

Typically, each communication medium comprises a separate application and protocol to enable a user to communicate via that medium. Therefore, to switch between, for example, an SMS chat and an IM chat requires the user to switch between different application interfaces. Not only can this create a segregation of contacts within a mobile device's address book, it can be difficult to remember which contacts can be communicated with via which medium/media. Moreover, the ability to communicate via several media lends itself to participating in multiple communication exchanges simultaneously. As such, having to switch between separate applications in order to carry on several communication exchanges can be an impediment to the usability of the mobile communication device.

BRIEF DESCRIPTION OF THE DRAWINGS

Embodiments will now be described by way of example only with reference to the appended drawings wherein:

FIG. 7 is a screen shot of another example user interface for inviting a new contact.

FIG. 8 is a screen shot of an example user interface for a contact list.

FIG. 11 is a screen shot of an example user interface for an SMS chat.

FIG. 12 is a screen shot of another example user interface for an SMS chat.

DETAILED DESCRIPTION OF THE DRAWINGS

To simplify the organization and accessibility of contacts that have various different communications capabilities, an IM contact list user interface can be used to integrate other contacts that have such different communications capabilities. In this way, contacts that have, for example, SMS capabilities, but not IM capabilities, can be included in the social network associated with the IM environment. To facilitate the creation of an integrated contact list such as this, the user interface also enables SMS-only contacts to be invited to be a "buddy" from the same user interface in which an IM invitation is created.

The contact list user interface can also be organized to distinguish between different contacts having different capabilities. For example, as illustrated below, SMS contacts may be included in a separate category to incorporate the SMS contacts into the IM list while ensuring that a conversation or chat with that contact is distinguished from IM chats. Examples of distinguishing an SMS chat from an IM chat include, without limitation: using different icons or other visual indicators in the chat or conversation interface, providing a text limit display for SMS chats in the conversation interface, and distinguishing between contacts using an identifier associated with entries in the contact list interface.

The ability to categorize contacts in the IM contact list interface can also enable a pending SMS contacts sub-list to be created that holds incoming SMS messages and associated contacts to enable the user to accept these contacts as new SMS contacts. This ability allows SMS messages to be conveniently routed into the IM contact list interface while enabling the user to sort and filter the messages for desired contacts and add those desired contacts to an SMS contacts category. As shown in greater detail below, SMS messages can be routed to the IM contact list interface automatically as an SMS message arrives, upon user request (e.g. via a menu), or using periodic synchronization processes.

For clarity in the discussion below, mobile communication devices are commonly referred to as "mobile devices" for brevity. Examples of applicable mobile devices include without limitation, cellular phones, cellular smart-phones, wireless organizers, pagers, personal digital assistants, laptops, handheld wireless communication devices, wirelessly enabled notebook computers, portable gaming devices, tablet computers, or any other portable electronic device with processing and communication capabilities.

Figure 1:
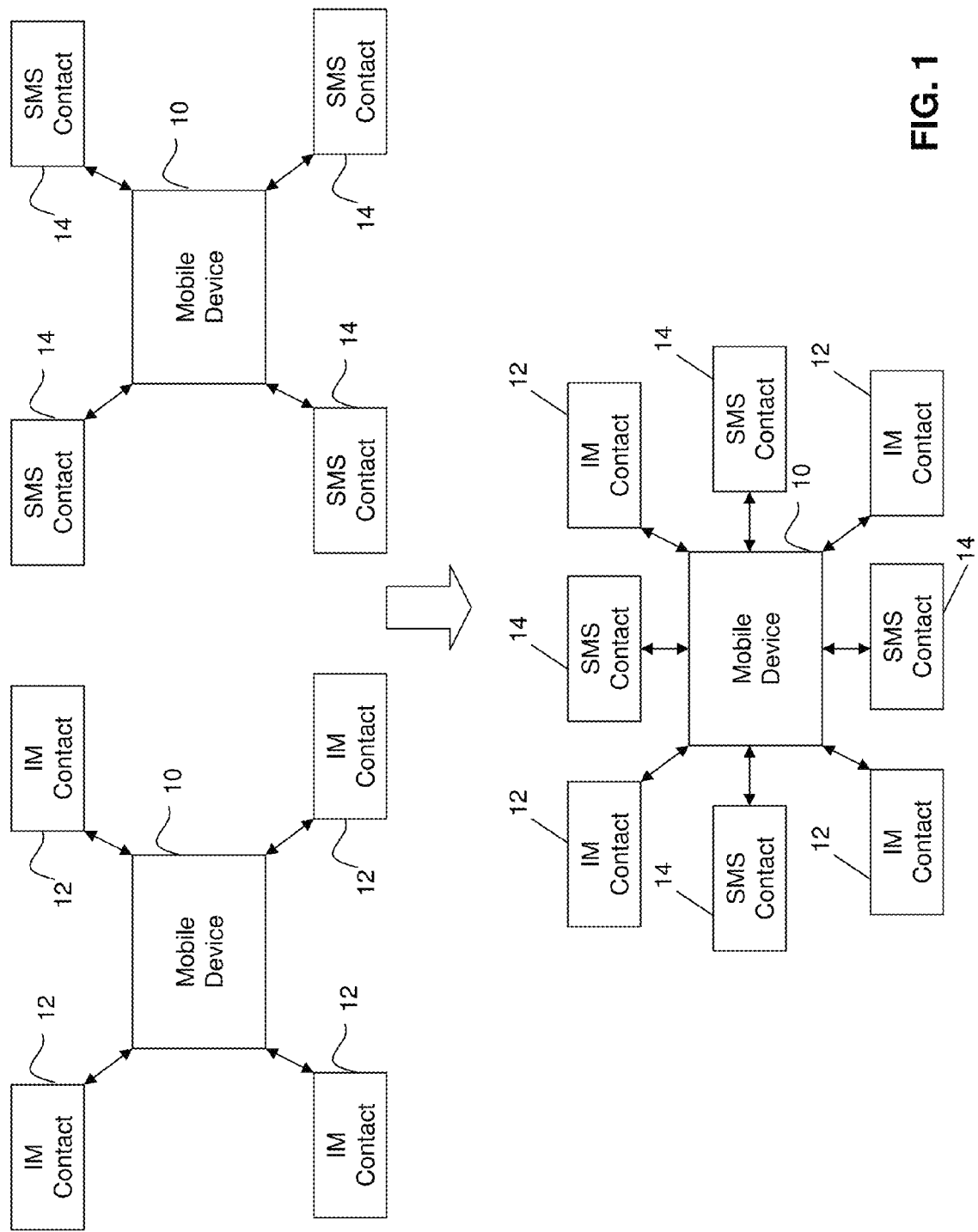
FIG. 1 provides a block diagram of an example environment wherein a mobile device comprises separate circles of contacts for IM and SMS-based contacts, and a block diagram of an example environment wherein the mobile device comprises an amalgamated circle of conversational-type messaging contacts including both IM and SMS contacts.

FIG. 1 illustrates the convergence of separate sets of IM contacts 12 and SMS contacts 14 for a mobile device 10. As discussed above, converging previously separated contacts enables a common contact list user interface to be provided to the user, thus avoiding the need to switch between different applications. Also, since other contact lists such as those provided in an electronic address book often have limited information for each entry without selecting a particular entry, it can be difficult to determine from an address book, whether or not a particular contact is accessible via SMS, IM, both, neither, etc. By converging and distinguishing between contacts that are accessible via SMS and IM, a single community of contacts as shown in FIG. 1 can be provided.

Figure 2:
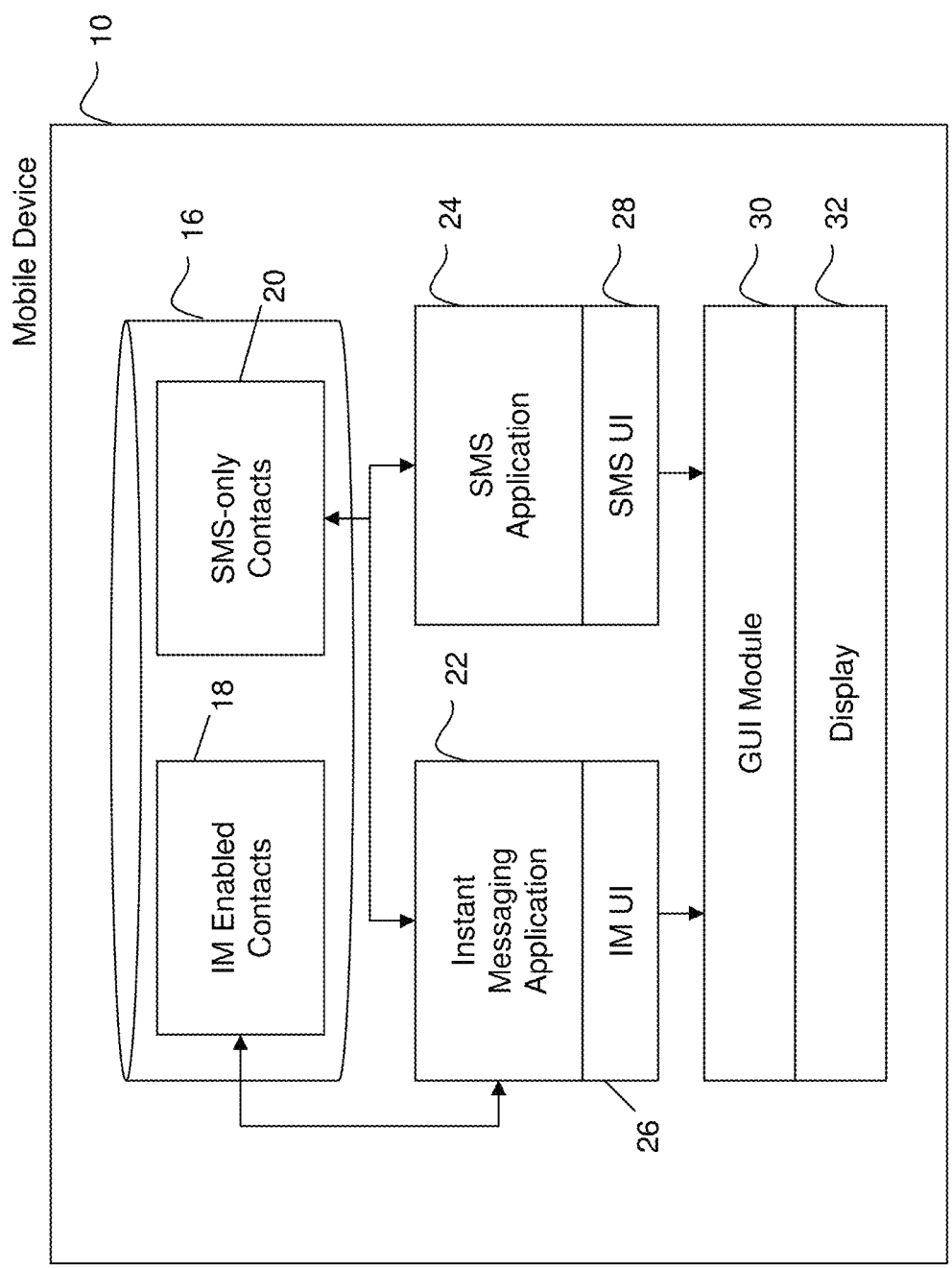
FIG. 2 is a block diagram showing an example configuration for the mobile device of FIG. 1.

FIG. 2 illustrates an example of a configuration for enabling a mobile device 10 to incorporate SMS-only contacts 20 into an IM user interface 26. In this example, a memory 16 is shown which provides the ability to store both IM enabled contacts 18 and SMS-only contacts 20. It will be appreciated that such contacts may be stored in separate portions of memory or can be accessed from an amalgamated list, e.g., an electronic address book (not shown). In this example, IM enabled contacts 18 are part of a separate and distinct IM contact list that is built and maintained for and by an IM application 22. The SMS-only contacts 20 may be part of an address book or correspond to data that is temporarily stored (e.g., incoming telephone calls, etc.). As such, it can be appreciated that the SMS-only contacts 20 are shown in the way depicted in FIG. 2 for illustrative purposes only. For the purposes of the examples below, an SMS-only contact 20 may refer to a device and associated user that does not have the ability to correspond via IM but can communicate via SMS. For example, a cellular telephone with only telephony capabilities could be considered an SMS-only contact 20, since although such devices allow SMS messages to be exchanged, they may lack the ability to communicate via IM platforms.

The IM application 22 typically has access to the IM contacts 18 for displaying the contacts in a contact list interface via an IM user interface (UI) 26. Similarly, an SMS application 24 typically accesses SMS contacts 20 by determining a telephone number associated with that contact and can display this information via an SMS UI 28 for conducting SMS chats. It can appreciated that often SMS and MMS capabilities are provided in the same UI and thus the principles described herein equally apply to the MMS medium. The mobile device 10 also comprises a GUI module 30 which utilizes the IM UI 26 and SMS UI 28 to present information and data to the user via a display 32.

In the configuration shown in FIG. 2, however, it can be seen that the IM application 22 is accessible to and/or can itself access the SMS-only contacts 20 in order to incorporate SMS-only contacts 20 into the IM UI 26. It can be appreciated that only one example configuration is shown in FIG. 2 and that the IM application 22 could instead, for example, obtain SMS-only contacts data by accessing the SMS application 24 or SMS UI 28.

Figure 3:
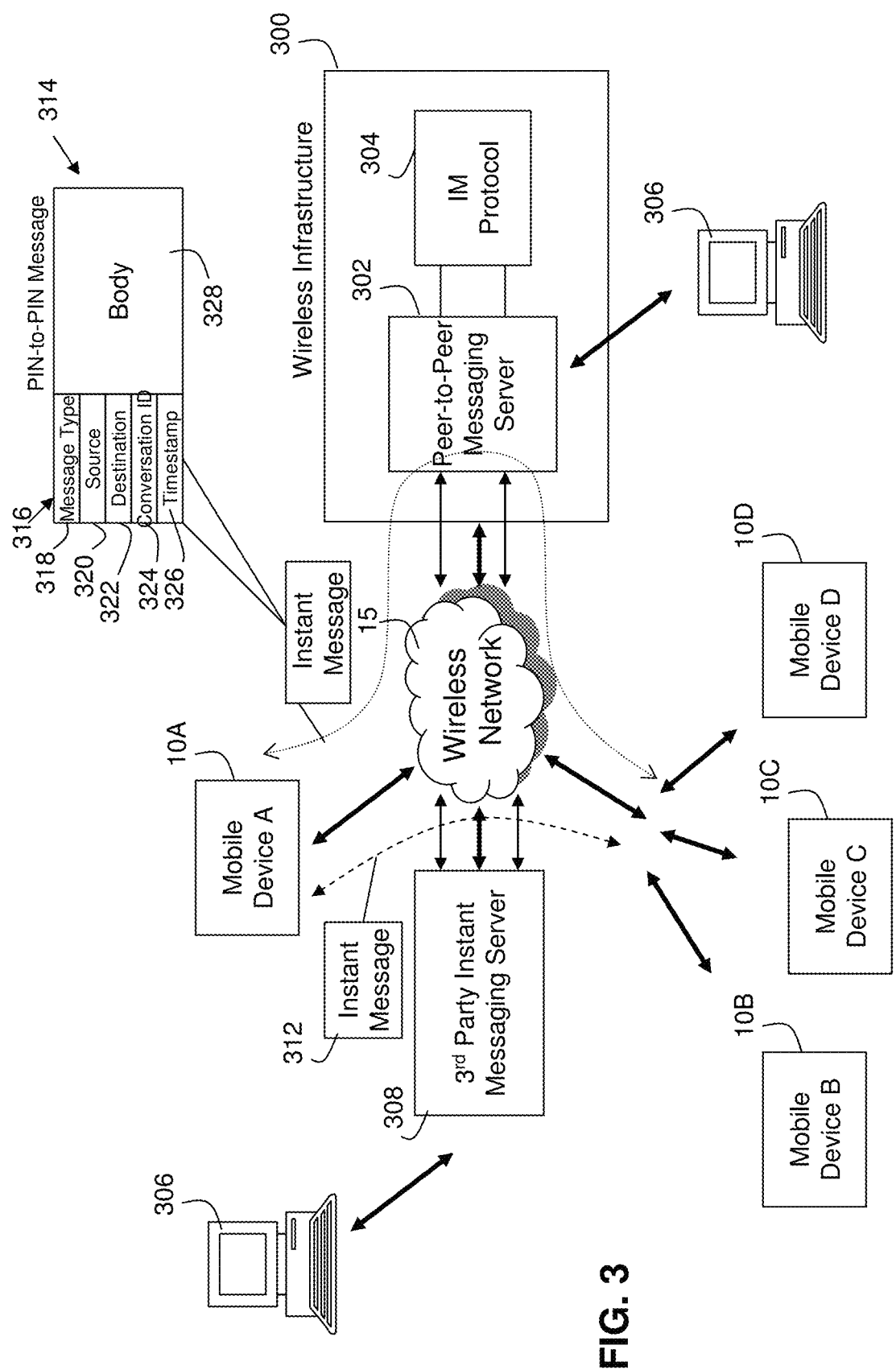
FIG. 3 is a system diagram showing one configuration for exchanging IMs on multiple platforms.

Turning now to FIG. 3, a configuration suitable for a user of mobile device A, hereafter referred to as mobile device 10A, to conduct instant messaging with buddies included in their IM contact list 18 is shown. In FIG. 3, two examples of instant messaging systems are shown. A first system incorporated into the wireless infrastructure 300 of a wireless network 15 is shown, which in this example is a peer-to-peer based system, e.g., a personal identification number (PIN)-based messaging system, that utilizes a device such as a server or router provided by the wireless infrastructure 300. A $3^{rd}$ party instant messaging service is also shown that utilizes a $3^{rd}$ party instant messaging server 308 accessed by mobile device 10A through the wireless network 15. As can be seen, the $3^{rd}$ party instant messaging server 308 may also communicate with desktop computers 306 thus facilitating instant messaging between desktop computers 306 and between a mobile device 10 and a desktop application on a desktop computer 306. Similarly, the peer-to-peer based messaging system may also facilitate communications with desktop computers 306.

In the example illustrated in FIG. 3, a PIN-based messaging system is implemented using a server-based communication infrastructure, such as one that provides email, SMS, voice, Internet and other communications. Particularly suitable for hosting a peer-to-peer messaging server 302 is a wireless router or server used in systems such as those that provide push-based communication services. In FIG. 3, the wireless infrastructure 300 facilitates communications such as instant messaging between mobile device 10A and mobile devices for User B, User C and User D, denoted by 10B, 10C and 10D respectively using a peer-to-peer messaging server 302. It will be appreciated that the number of users participating in the example shown in FIG. 3 is for illustrative purposes only. Instant messaging is provided by an instant messaging program or application stored on each mobile device 10A-10D which can be initiated, for example, by highlighting and selecting an instant messaging icon from a display as is well known in the art. The peer-to-peer messaging server 302 routes messages between the mobile devices 10A-10D according to an IM protocol 304.

An instant message is generally denoted by numeral 314 in FIG. 3, and has a format that is particularly suitable for a PIN-to-PIN based system. In a typical IM protocol 304, each message 314 has associated therewith a source corresponding to the mobile device 10 which has sent the message 314 and includes a destination identifying the intended recipient. Further detail of an example structure for the messages 314 is also shown in FIG. 3. Each message 314 generally comprises a body 328, which contains the content for the message 314 (e.g., text), and a header 316, which contains various fields used for transmitting and processing each message 314. In this example, the header 316 includes a message type field 318 to specify the type of transmission (e.g., PIN, SMS, etc.), a source field 320 to specify the device address for the sender, a destination field 322 to specify the device address for the intended recipient, a conversation ID field 324 to identify which conversation thread the message 314 corresponds to (e.g., such that each message 314 is identified by the conversation in which the message was sent), and a timestamp field 326 to indicate the time (and if desired, the date) at which the message 314 was sent by the designated sender.

It will be appreciated that other information or attributes may be included in the message 314, such as a subject field (not shown) to enable a subject for part or all of the conversation to be transported with the message 314 (e.g., to create new subjects, modify subjects, notify others of subjects, etc.). Although not shown in FIG. 3, one or more tags can also be used to indicate to the instant messaging application 22, upon receipt of a message 314, that the message 314 has certain attributes such as a subject that is to be displayed, whether additional information is being transported (i.e. data or information in addition to the message content), or whether the message 314 is being used for some other purpose such as provisioning, synchronization, etc.

In general, in an IM protocol 304, the sender of the message 314 knows the address of the intended recipient, e.g. a PIN. This may be established when the two devices request to add each other to their respective contact or buddy lists. At the time of requesting new contacts, in traditional IM protocols 304, the two respective PIN numbers may be exchanged via request e-mails which are configured to be intercepted by the respective instant messaging applications 22 so as to not appear in the message list or "inbox" of the user. In other examples, to avoid the exchange of email messages to add a buddy to the IM contact list 18, a global address list (GAL) application (at the host system—not shown) may instead be accessed in order to obtain the source address for the intended recipient directly. Alternatively, the user may simply ask for the source address from another user and enter it manually.

It can be seen in the example shown in FIG. 3 that mobile device 10A can communicate directly with any of the mobile devices 10B-10D through the peer-to-peer messaging server 302 as indicated by the short-dashed line. Instant messaging can also be accomplished through the $3^{rd}$ party IM server 308 by sending $3^{rd}$ party based instant messages 312 over the wireless network 15 as indicated by the long-dashed line.

When conducting an instant messaging session according to the example shown in FIG. 3, the mobile devices 10A-10D can communicate directly with the wireless infrastructure 300 in a client based exchange where, similar to other peer-to-peer programs, an intermediate server is not required. A message 314 sent by one mobile device 10 is received by the wireless infrastructure 300, which obtains the address for the intended recipient from information associated with the message 314 (e.g. a data log) or from the message 314 itself. Upon obtaining the recipient's address according to the IM protocol 304, the wireless infrastructure 300 then routes the message 314 to the recipient associated with the mobile device 10 having such address. The wireless infrastructure 300 typically also provides a delivery confirmation to the original sender, which may or may not be displayed to the user. The destination device can also provide such delivery information. The wireless infrastructure 300 should be capable of routing messages 314 reliably and hold onto the messages 314 until they are successfully delivered. Alternatively, if delivery cannot be made after a certain timeout period, the wireless infrastructure 300 may provide a response indicating a failed delivery. The wireless infrastructure 300 may choose to expire a message 314 if a certain waiting period lapses.

Figure 4:
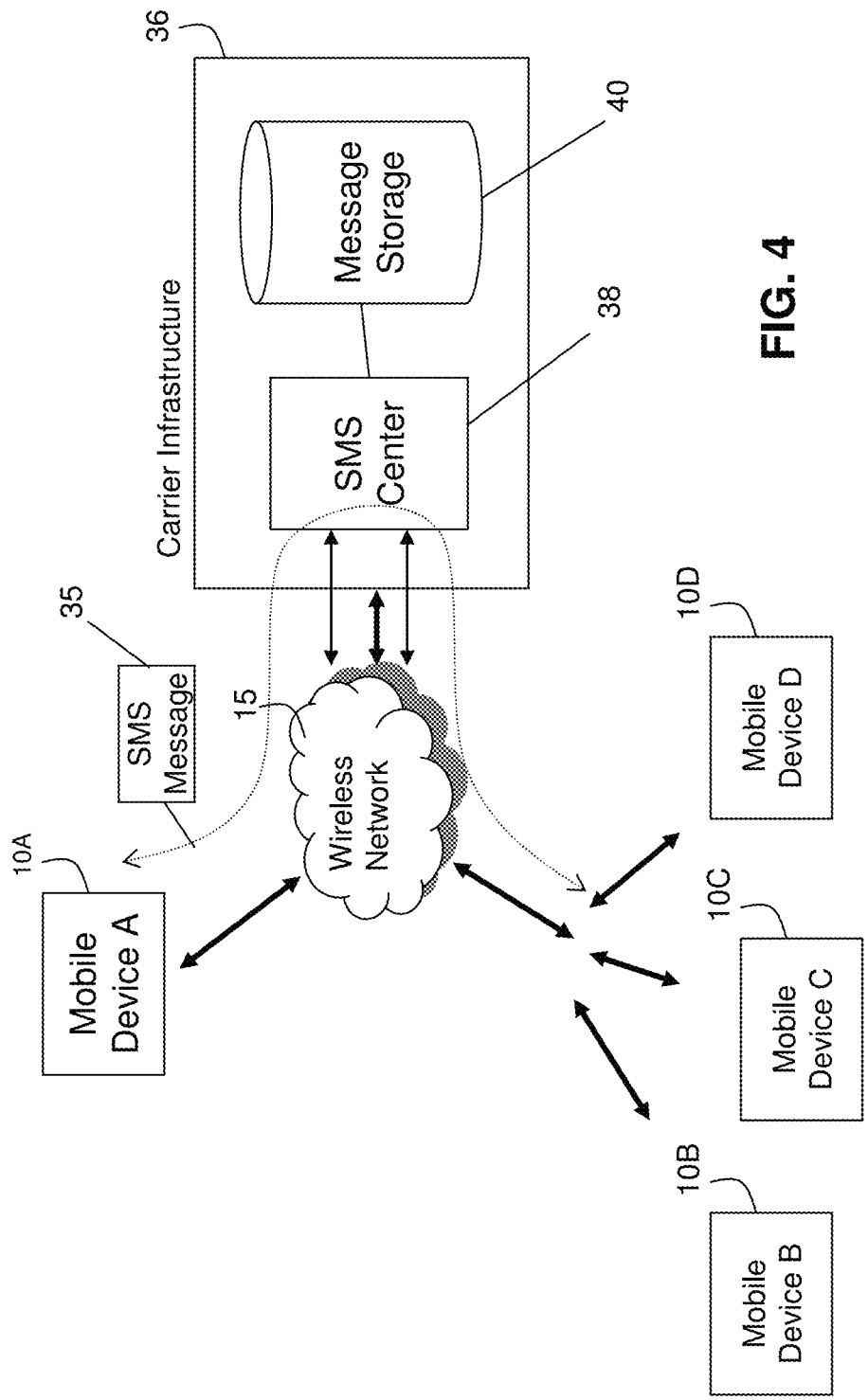
FIG. 4 is a system diagram showing one configuration for exchanging SMS messages via an SMS Center (SMSC).

It will also be appreciated that, as noted above, messaging can be implemented using any other suitable protocol such as SMS. As shown in FIG. 4, in an SMS system, a message 35 is transmitted to an SMS center (SMSC) 38 within a carrier's infrastructure 36, and then delivered to the mobile phone number of the destination device (mobile devices 10A, 10B, 10C, or 10D in this example). The SMSC would also be configured to hold onto messages 35 by storing the messages in a message storage memory 40 and delivering the messages once the destination device is within coverage of the wireless network 15.

Turning back to FIG. 3, when conducting an instant messaging session using a $3^{rd}$ party IM application, access to the $3^{rd}$ party IM server 308 is first established and instant messages 312 are exchanged over the wireless network 15 according to the appropriate protocol used by the $3^{rd}$ party. It will be appreciated that the principles discussed below are equally applicable to both peer-to-peer (e.g., PIN-to-PIN) messaging and other Internet service-based messaging systems hosted by such $3^{rd}$ parties.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, wireless infrastructure 300, peer-to-peer messaging server 302, $3^{rd}$ Party IM server 308, SMSC 38, carrier infrastructure 36, etc., or accessible or connectable thereto. Any application or module herein described may be implemented using computer readable/executable instructions that may be stored or otherwise held by such computer readable media.

Figure 5:
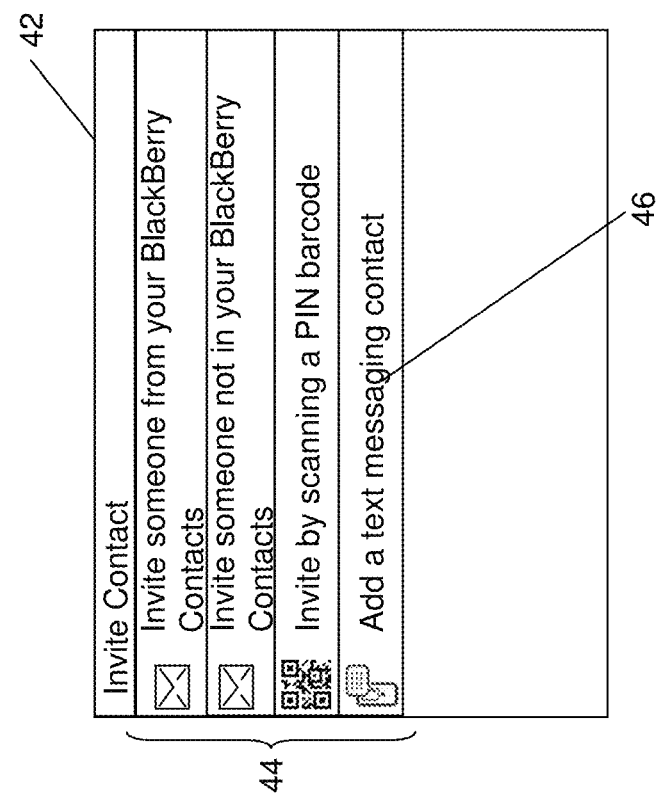
FIG. 5 is a screen shot of an example user interface for inviting a new contact.

FIG. 5 illustrates an example screen shot of an Invite Contact interface 42, which may be initiated and displayed from the IM application 22, e.g., via a menu (not shown). The Invite Contact interface 42 lists a number of invitation mechanisms 44 which can enable the user to, for example, invite an existing contact (e.g., from an address book) to be an IM buddy or invite someone that is not already an existing contact using an email invitation. Also shown is an alternative invitation mechanism 44 that enables the user to invite another device via a short-range transfer using a 2D barcode. In this example, the mobile device 10 would utilize a camera (not shown) to capture an image of a 2D barcode being displayed by another device, the 2D barcode encoding a PIN number for that device.

Figure 6:
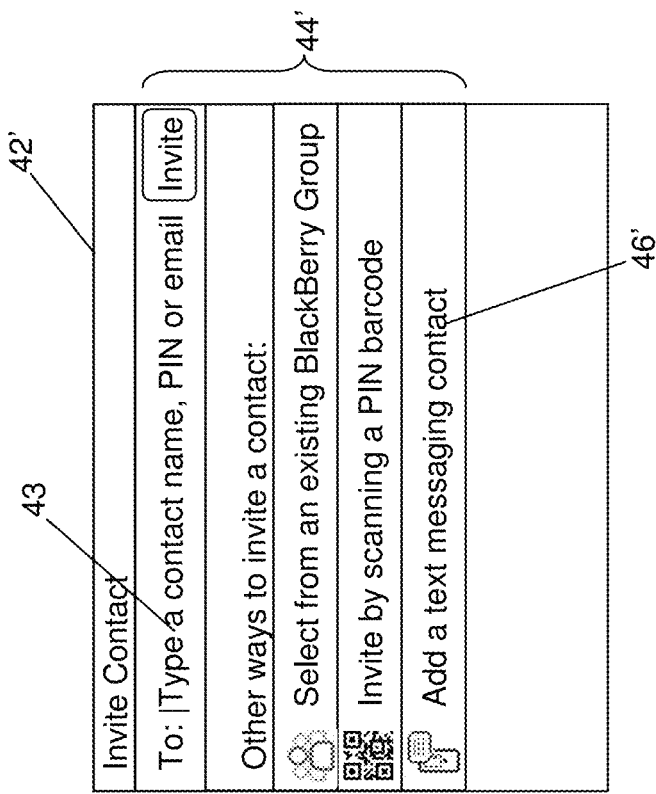
FIG. 6 is a screen shot of another example user interface for inviting a new contact.

Also shown in FIG. 5 is an SMS invite option 46, which enables the user to add a text messaging contact (e.g., SMS-only contact 20 shown in FIG. 2) as a new IM contact 18. By allowing SMS contacts to be invited to be an IM contact, the user associated with that SMS contact information can be included in the social network provided by the IM environment, despite not having the ability to chat via the IM application 22. FIG. 6 illustrates another example Invite Contact interface 42' wherein other similar reference numerals are given the suffix ('). It can be seen that the example shown in FIG. 6 is similar to that shown in FIG. 5 but also includes a text entry mechanism 43 to enable a search or auto-completion process to be applied upon detecting entry of one or more characters. FIG. 7 illustrates yet another example Invite Contact interface 42" wherein other similar reference numerals are given the suffix ("). FIG. 7 is also similar to the interface 42 shown in FIG. 5 but also includes an entry 44" for adding a member from an electronic group. Also, in FIG. 7, the SMS invite option 46" refers to the contact to be added as an SMS/MMS contact. It can therefore be appreciated that various interfaces having various options for inviting contacts can be used and by including an SMS invite option 46, contacts such as the SMS-only contacts 20 shown in FIG. 2 can be integrated into an IM contact list 18.

FIG. 8 illustrates an example of an IM contact list interface 54, which lists a number of expandable/collapsible categories 56, such as chats, contacts, groups, etc. In this example, the categories 56 include an SMS contacts category 57, which enables the IM contact list interface 54 to provide a distinction between those contacts that can be communicated with via IM and those that can be communicated with via SMS. It can be appreciated that some contacts may be accessible via both IM and SMS, however, in this example, the SMS contacts category 57 is used to identify SMS-only contacts 20. In other examples (not shown), other SMS-enabled contacts that are also IM contacts could also be organized (or duplicated) under the SMS contacts category 57, e.g., if SMS is a preferred communication medium for that contact.

Figure 9:
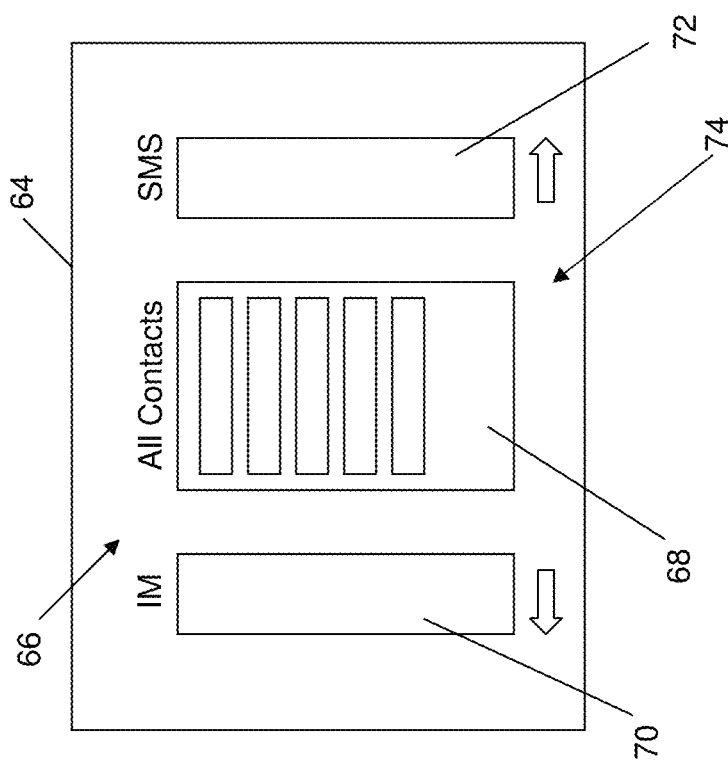
FIG. 9 is a screen shot of an example user interface for viewing organized lists of contacts.

FIG. 9 illustrates an alternative contact list interface 64, wherein contact groupings 66 are illustrated in a "carousel" type manner. In this example, an all contacts category 68 is shown at the forefront of the carousel with other grouping shown to either side. An IM grouping 70 is shown to the left of the All Contacts grouping 68, and an SMS grouping 72 is shown to the right of the All Contacts grouping 68. A scrolling mechanism 74 is also provided to enable the user to utilize an available input device to turn the carousel and bring a particular grouping to the forefront. For example, a mobile device 10 comprising a touch-screen would allow a user to "flick" or otherwise drag a finger across the touch screen to effect the rotation of the carousel. Similarly, a flick or sideways movement of a trackball or track-pad could perform a similar operation.

Figure 10:
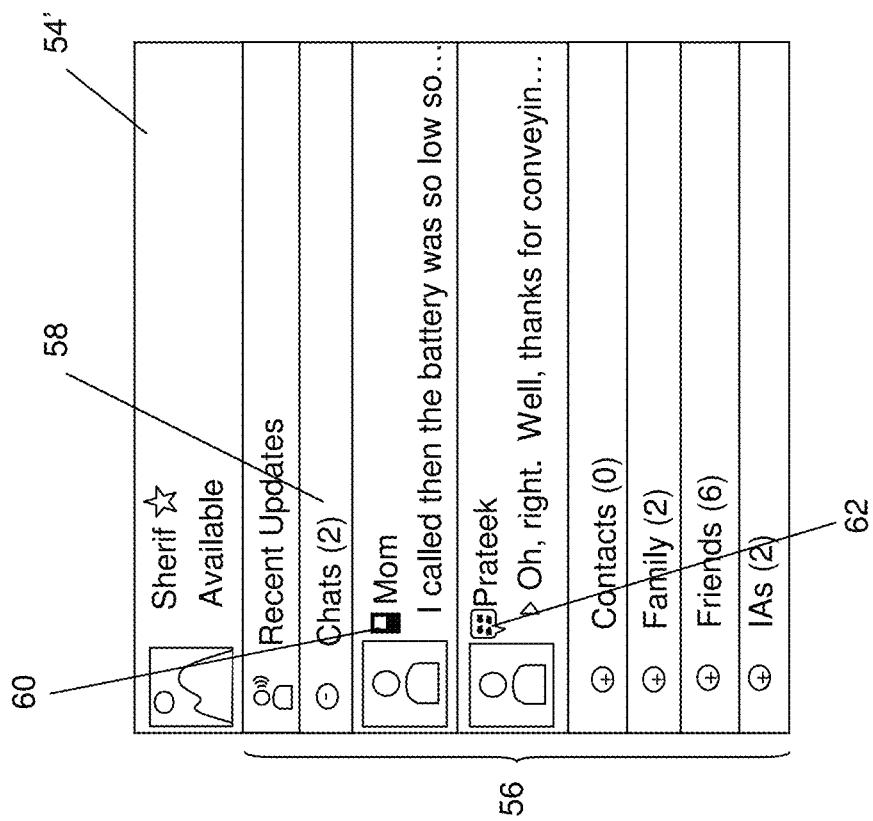
FIG. 10 is a screen shot of another example user interface for a contact list.

Although the SMS-only contacts 20 are shown using a separate category 57 in FIGS. 8 and 9, other ways of distinguishing between IM and SMS chats may be used. For example, as shown in FIG. 10, within a chats category 58, a first visual identifier 60 can be used to mark an SMS chat and a second visual identifier 62 can be used to mark an IM chat. In the example shown in FIG. 10, an icon is used to provide distinct visual identifiers 60, 62. By providing the first visual identifier 60, the user can distinguish between chats that are via SMS from those via IM. Where data plans or other cost considerations are important, e.g., where SMS involves a cost per message, providing such an identifier 60 can alert the user to the potential excess charges. It can be appreciated that the visual identifiers 60, 62 can be used for contacts that are accessible via both SMS and IM to enable the user to, for example, switch to IM for longer conversations. In this way, the contact list interface 54 can not only integrate SMS and IM chats and contacts into a single access point, the visual identifiers 60, 62 can also be used to distinguish between different media for warning against excess charges or other limitations (e.g., message size) associated therewith.

Another way to distinguish between SMS and IM chats is shown in FIGS. 11 and 12. In FIG. 11, an SMS chat interface 48, which includes a series of messages 50, includes a visual indicator within the chat interface 48 to indicate to the user during the chat that they are communicating via SMS rather than IM. In FIG. 11, the visual indicator is an SMS-related icon 52. As discussed above, by distinguishing between SMS and IM chats, contacts can be integrated into a single access point for chats and contacts without causing confusion as to the costs and potential comparative limitations between the different media. FIG. 12 illustrates another example visual indicator, which in this example comprises a text limit identifier 53. It can be appreciated that an IM chat interface (not shown) may include its own visual identifier or none at all to distinguish IM chats from SMS chats. In this example, the icon 52 or text limit identifier 53 is used in SMS chats to draw the user's attention to that particular medium, when that medium is being used.

Figures 13, 14:
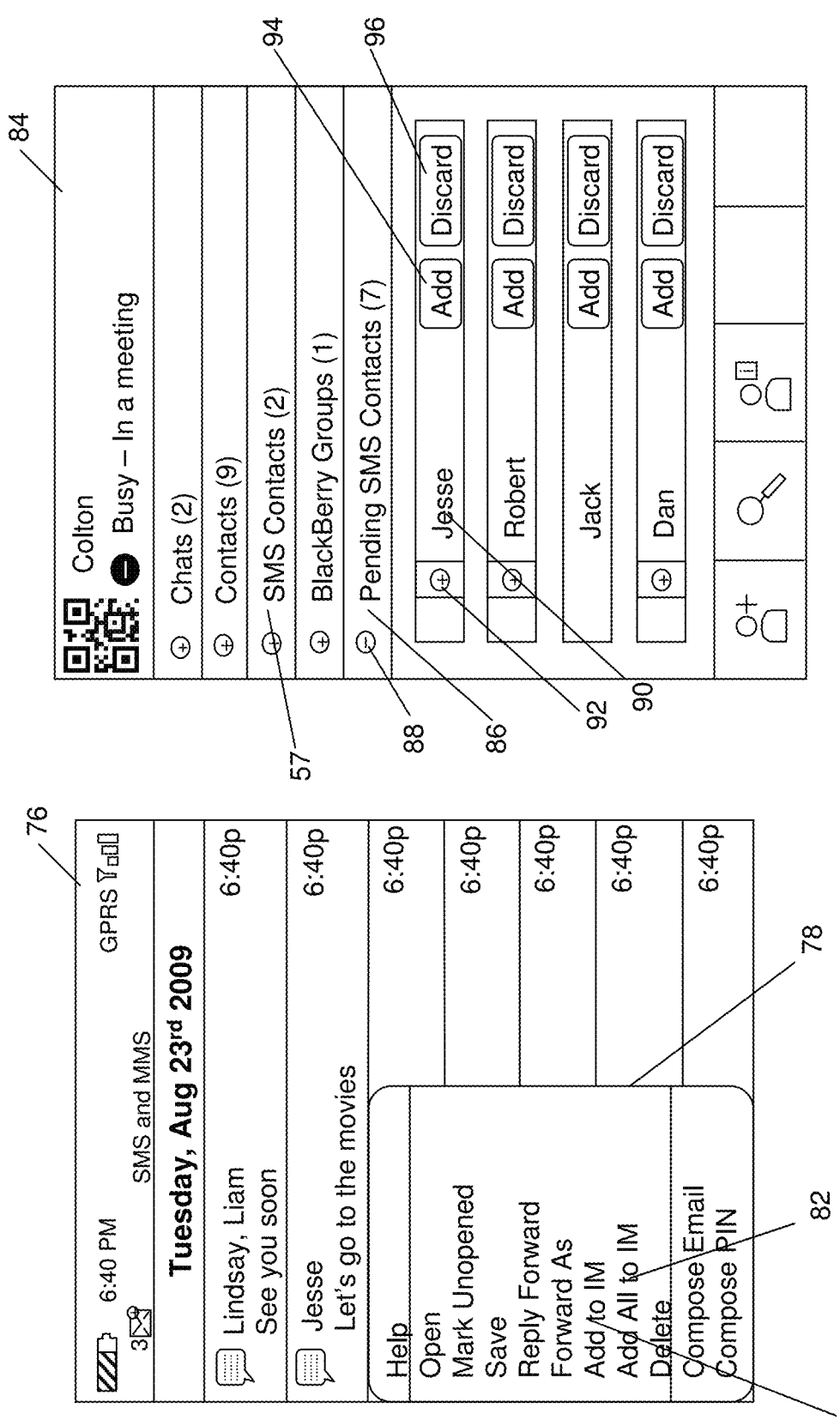
FIG. 13 is a screen shot of an example menu in an SMS interface enabling messages from SMS contacts to be routed to an IM contact list.
FIG. 14 is a screen shot of an example user interface for a contact list comprising a series of pending SMS contacts routed thereto.

In addition to inviting SMS-only contacts 20 to become contacts in an IM contacts interface 54, as noted above, SMS messages 35 can also be routed or otherwise provided to the IM contact list interface 54 to enable the user to initiate new contact additions by selecting from incoming SMS data. Turning now to FIG. 13, one way in which to allow SMS-only contacts 20 to be added to the IM UI 26 is to provide a menu 78 that includes an Add to IM option 80. The Add to IM option 80 enables the user to select a particular SMS message from an SMS and MMS interface 76 and invoke the menu to conveniently add that particular contact to the IM UI 26. In this way, if the user determines that they wish to add a particular SMS-only contact 20 to their social network defined by their IM contact list interface 54, they can do so directly from the interface 76. It can be appreciated that the Add to IM option 80 can also route other SMS messages from the selected contact at the same time so that the SMS messages may be grouped together in an IM interface, e.g., to provide a chat history. Also shown in the menu 78 is an Add. All to IM option 82, which can be used to initiate a wholesale routing of multiple SMS messages 35 into the IM contact list interface 54 (e.g., all messages or all new messages—i.e. those not previously routed). It can be appreciated that any plurality of SMS messages can be routed concurrently to the IM application. The menu 78 enables the user to control the routing of the SMS messages 35, however, it can be appreciated that automatic routing can be performed by the SMS application 24 or IM application 22 as is explained in greater detail below.

FIG. 14 illustrates another contact list interface 84 that includes a Pending SMS Contacts category 86. The Pending SMS Contacts category 86 is shown in an expanded form in FIG. 14 and can be collapsed using an expand/collapse option 88. By expanding the Pending SMS Contacts category 86 as shown, routed SMS messages and details of the associated contact (collectively an entry 90) can be viewed. In this example, each entry 90 also comprises an expand/collapse option 92 to enable the user to view multiple messages from the same contact if applicable, e.g., for providing additional context when deciding whether or not to add that particular SMS-only contact 20. Alternatively, as discussed above, a single entry can be provided for each pending contact with multiple messages grouped into a conversation history, similar to an IM conversation. An Add option 94 may be selected to add the entry 90 to the SMS contacts category 57 to become a new contact. A Discard option 96 can instead be selected to discard the entry 90. It can be appreciated that the Pending SMS Contacts category 86 can be controlled to manage its size, e.g., to only store a particular number of entries 90 or to limit the number of entries 90 based on a size (memory) limit. By providing the Pending SMS Contacts category 86, the user can browse the SMS messages 35 routed into the IM contact list interface 84 and select those that they wish to include in the integrated contact list. SMS messages 35 that are associated with already existing contacts can be pre-filtered to provide the user with only potential new SMS-only contacts 20. Alternatively, an entry 90 that exists in another category may be marked with an indicator (not shown). Similarly, if the same contact can be communicated with using both IM and SMS, the IM application 22 can be operable to also provide a separate category (not shown) for IM/SMS contacts with messages using both types of media displayed in a single shared conversation screen. In such a shared conversation, an option for which medium to use can be provided to allow the user to select whether to send a message using IM or SMS.

Figure 15:
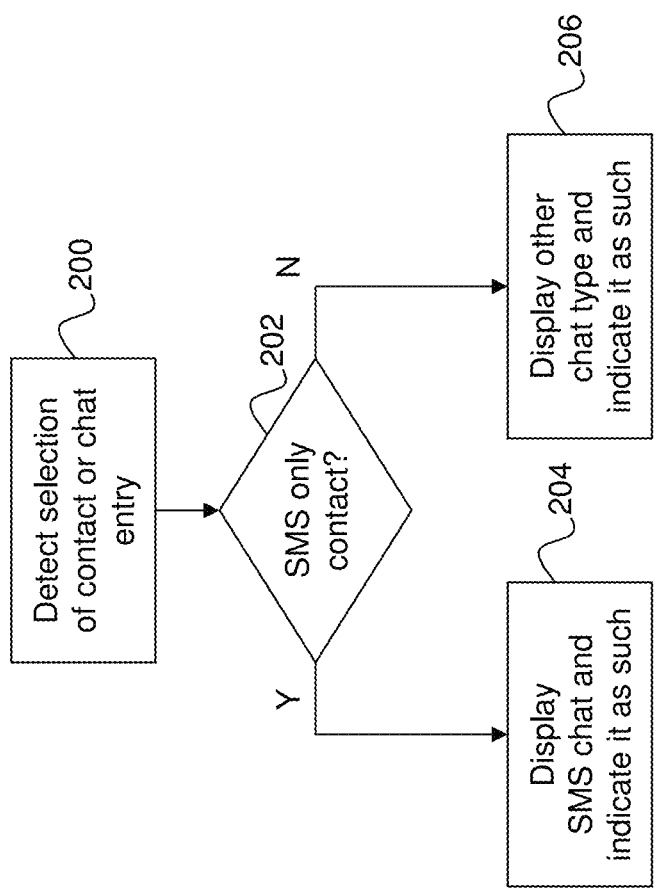
FIG. 15 is a flow chart illustrating example computer executable instructions for distinguishing between SMS and IM chats.

FIG. 15 illustrates an example of a set of computer executable instructions that may be executed by the IM application 22 in distinguishing between SMS chats and IM or other chats, e.g., as shown in FIGS. 11 and 12. At 200, the IM application 22 detects selection of a contact or chat entry from the contact list interface 54, 84 and determines, at 202, if the associated contact is an SMS only contact. If so, a new (or existing) SMS chat interface 48 is displayed, at 204, and the SMS chat is indicated as such, e.g., using a visual identifier 52 or text limit indicator 52' as illustrated above. If the contact or chat corresponds to another medium, e.g., IM, the IM application 22 displays the other chat type, at 206, and indicates it as such. For example, by providing an IM-specific identifier or no identifier at all could distinguish an IM chat from an SMS chat.

Figure 16:
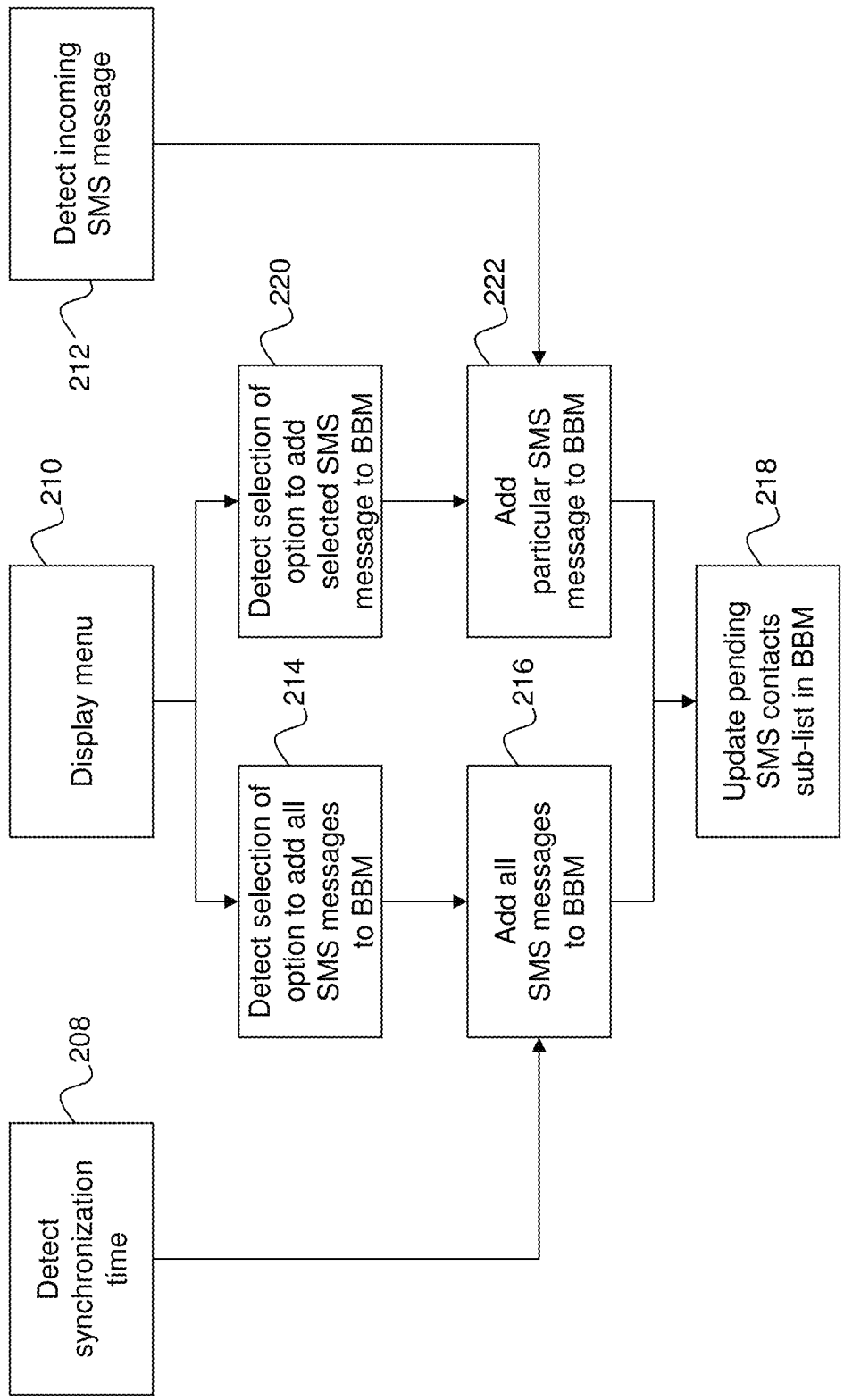
FIG. 16 is a flow chart illustrating example computer executable instructions for routing SMS messages to an IM contact list.

FIG. 16 illustrates an example of a set of computer executable instructions that may be executed by the SMS application 24 or IM application 22 in routing SMS messages 35 to the IM contact list interface 54, 84. In this example, three example optional mechanisms are shown for routing the SMS messages 35. At 208, a synchronization time is detected, e.g., for periodic routing of messages currently in the SMS interface 76. At 210, the menu 78 is displayed, e.g., by being initiated using an appropriate input device on the mobile device 10. At 212, an incoming SMS message 35 is detected, triggering an automatic routing "on-the-fly". If the menu is displayed, at 210, selection of the Add All to IM option 82 may be detected, at 214, or the Add to IM option 80 detected, at 220. If the Add All to IM option 82 has been selected, all SMS messages are routed to the IM contact list interface 54, 84, at 216, and the Pending SMS Contacts category 86 updated, at 218. It can be appreciated that the same or similar operation would occur if the synchronization time is used, at 208. It can also be appreciated that adding all SMS messages may not necessarily involve adding every SMS message in the SMS interface 76. For example, the last message routed may be stored and only those newer than that message routed to avoid routing duplicate copies of the same SMS message 35. If the Add to IM option 80 has been selected, a particular SMS message 35 would be added to the IM contact list interface 54, 84, at 222. It can be appreciated that the same or similar operation would occur if each incoming SMS message 35 is routed on-the-fly, at 212. Once the one or more SMS messages 35 have been routed to the IM contact list interface, as mentioned above, the Pending SMS Contacts category 86 is updated, at 218.

It can therefore be seen that by enabling SMS-only contacts to be integrated into an IM environment enables the IM application 22 to be inclusive of any desired contact into the social network created therein rather than excluding those contacts without IM capabilities. Moreover, by distinguishing between SMS and IM chats (and contacts), limitations and potential differential costs associated with the respective mediums can be identified. In this way, a user can control the amount of messaging that occurs in a particular chat to minimize cost or to switch to another medium where appropriate. In addition to providing the user with selective control over inviting new SMS-only contacts 20 into their IM environment, the SMS application 24 or IM application 22 can be configured to route SMS messages 35 into the IM contact list interface 54, 84 for later filtering and/or selection by the user. By providing SMS-specific categories with the IM contact list interface 54, 84 SMS integration operations such as routing of SMS messages can be controlled to avoid degrading the user's experience.

Figure 17:
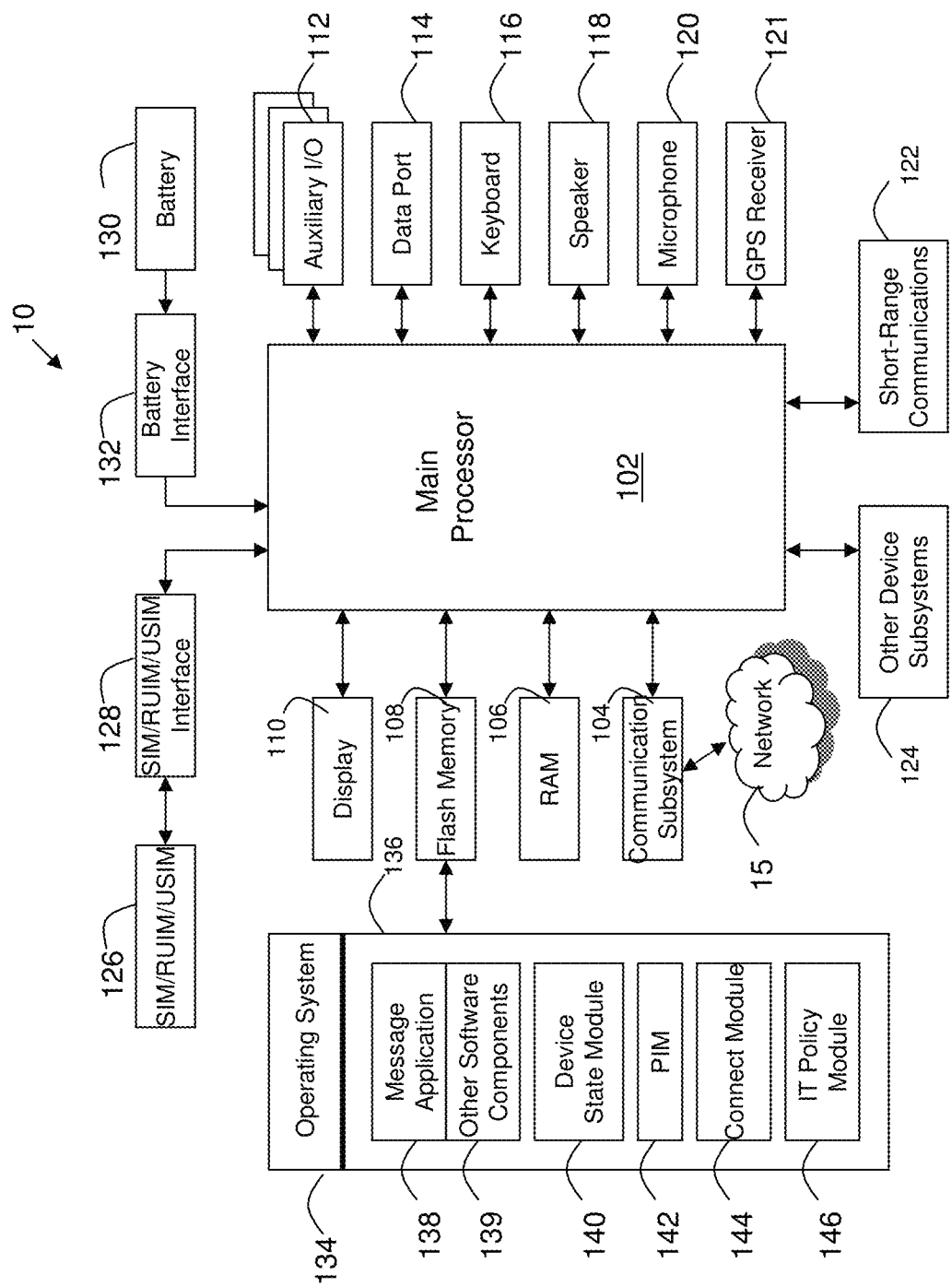
FIG. 17 is a block diagram of an example mobile device.

Referring now to FIG. 17, shown therein is a block diagram of an example of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 15. In this example embodiment of the mobile device 10, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 15 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, GPS receiver 121, short-range communications 122 and other device subsystems 124.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 15, and device-resident functions such as a calculator or task list.

The mobile device 10 can send and receive communication signals over the wireless network 15 after network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 15. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and includes a battery interface 132 for receiving one or more batteries 130 (typically rechargeable). In at least some examples, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 15. PIM data items may be seamlessly integrated, synchronized, and updated via the wireless network 15 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 10. The IT policy data can then be stored in the flash memory 108 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 15, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 15. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may comprise devices such as: a touch screen, mouse, track ball, infrared fingerprint detector, optical trackpad or a roller wheel with dynamic button pressing capability. The keyboard 116 is an alphanumeric keyboard and/or telephone-type keypad. However, other types of keyboards may also be used. A composed item may be transmitted over the wireless network 15 through the communication subsystem 104.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 110 can also be used to provide additional information such as the identity of a calling party, duration of a voice call, or other voice call related information.

Although the above has been described with reference to certain specific embodiments, various modifications thereof will be apparent to those skilled in the art without departing from the scope of the claims appended hereto.

The invention claimed is:

1. A method of operating a mobile device having an instant message conversation user interface for an instant messaging application, the method comprising:
   receiving, at the mobile device, a short message service message for a short message service application, the short message service message having been sent to the mobile device via a short message service protocol;
   providing the received short message service message to the instant messaging application on the mobile device, the instant messaging application being a separate application from a short message service application;
   identifying a contact associated with the short message service message; and
   displaying, in a conversation instance of the instant message conversation user interface, the short service message, the identified associated contact, and an indicator of the short message service as a message sent by the short message service protocol.

2. The method according to claim 1, wherein the providing is initiated via selection of a menu option.

3. The method according to claim 1, wherein the providing is performed on a plurality of short message service messages.

4. The method according to claim 3, wherein the plurality of short message service messages relates to a same contact.

5. The method according to claim 1, wherein the providing is performed on new short message service messages as each new short message service message is received.

6. A non-transitory computer readable medium comprising computer executable instructions that when executed by a computing device cause the computing device to operate to:
   receive, at the mobile device, a short message service message for a short message service application, the short message service message having been sent to the mobile device via a short message service protocol;
   provide the received short message service message to the instant messaging application on the mobile device, the instant messaging application being a separate application from a short message service application;
   identify a contact associated with the short message service message; and display, in a conversation instance of the instant message conversation user interface, the short service message, the identified associated contact, and an indicator of the short message service as a message sent by the short message service protocol.

7. The non-transitory computer readable medium according to claim 6, wherein the providing is initiated via selection of a menu option.

8. The non-transitory computer readable medium according to claim 6, wherein the providing is performed on a plurality of short message service messages.

9. The non-transitory computer readable medium according to claim 8, wherein the plurality of short message service messages relates to a same contact.

10. The non-transitory computer readable medium according to claim 6, wherein the providing is performed on new short message service messages as each new short message service message is received.

11. A mobile device comprising a processor and memory, the memory storing computer executable instructions that when executed cause the processor to operate to:
   receive, at the mobile device, a short message service message for a short message service application, the short message service message having been sent to the mobile device via a short message service protocol;
   provide the received short message service message to the instant messaging application on the mobile device, the instant messaging application being a separate application from a short message service application;
   identify a contact associated with the short message service message; and
   display, in a conversation instance of the instant message conversation user interface, the short service message, the identified associated contact, and an indicator of the short message service as a message sent by the short message service protocol.

12. The mobile device according to claim 11, wherein the providing is initiated via selection of a menu option.

13. The mobile device according to claim 11, wherein the providing is performed on a plurality of short message service messages.

14. The mobile device according to claim 13, wherein the plurality of short message service messages relates to a same contact.

15. The mobile device according to claim 11, wherein the providing is performed on new short message service messages as each new short message service message is received.

* * * * *